A. W. OLDS.
CULTIVATOR.
No. 36,724. Patented Oct. 21, 1862.
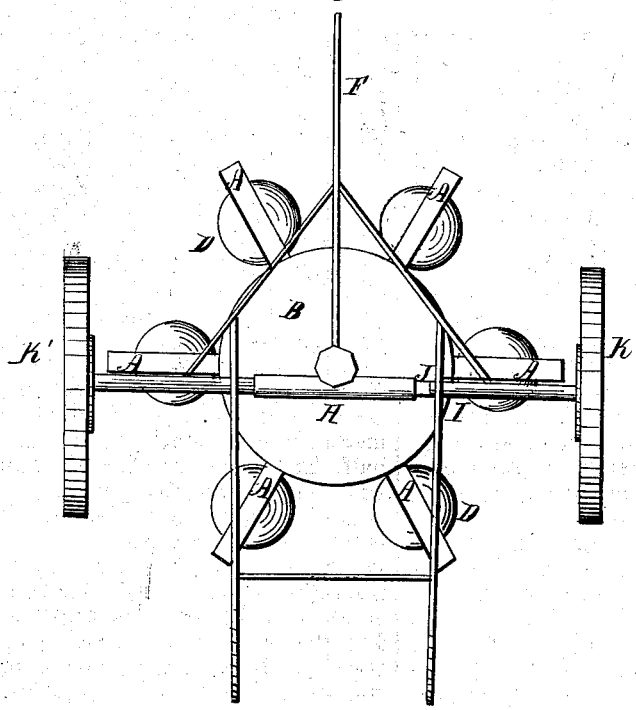
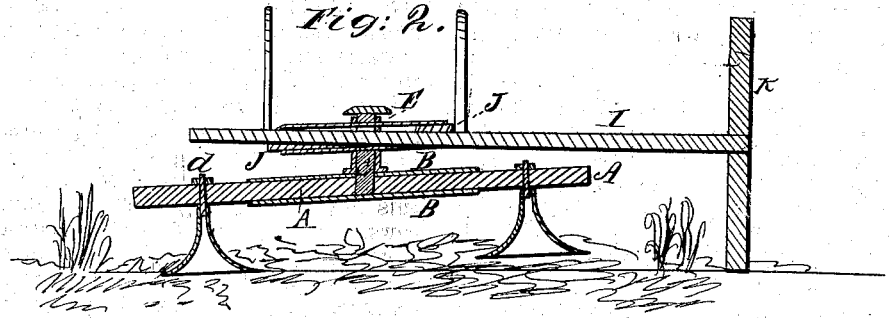
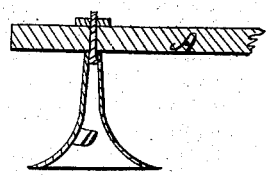
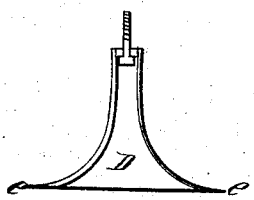
Witnesses
J. Bramen
H. H. Hodge
Inventor
A. W. Olds

UNITED STATES PATENT OFFICE.

ALONZO W. OLDS, OF GREEN OAK, MICHIGAN.

IMPROVEMENT IN CULTIVATORS.

Specification forming part of Letters Patent No. 36,724, dated October 21, 1862.

*To all whom it may concern:*

Be it known that I, ALONZO W. OLDS, of Green Oak, in the county of Livingston and State of Michigan, have invented new and useful Improvements in Cultivators; and I do hereby declare that the following is a full and complete description of the construction and operation, reference being had to the accompanying drawings, making part of this specification, in which—

Figure 1 is a top view, and Fig. 2 is a section.

Like letters refer to like parts in the several views.

The nature of my invention relates to such a construction of a cultivator that it is supported in part by one or more bearing-wheels so arranged and adjusted that a forward movement of the implement will cause a positive rotation of the cultivator, as hereinafter specified, and to the form and structure of the cultivator-teeth.

A A A represent the arms or frame-work of the cultivator. These radiate from between two circular plates, B B, to which they are secured by bolts or otherwise.

A spindle or vertical axis, C, rises from the center of the plates B B, and upon this vertical axis is placed a pipe-box, E. The draw-bar F is secured to this pipe-box E, thus allowing the plates B and arms A to rotate upon the axis C.

To the back part of the pipe-box E is secured a flange or tube, H, to which is attached by bolts or otherwise an axle-tree, I. If a tube is used, the axle-tree passes through it, or a simple flange may be used, and the axle-tree secured to it by both. In either case wedges J J may be used to adjust the axle-tree obliquely to the spindle C; or the axle-tree may be secured at right angles thereto, and the wheels adjusted higher or lower by means of an adjustable axle.

K K' represent the bearing-wheels. There may be either one or two used. In either case the axle-tree and wheels should be so adjusted that one side or the other of the cultivator will be slightly elevated, as in Fig. 2, and this will cause one side to press more lightly upon the soil than the other, and thus cause positive rotation, depending for its direction as to whether the wheel K or K' is raised. Where but one wheel is used that side of the cultivator toward the wheel will move forward faster than the other side, for the reason that the teeth on the opposite side take deeper hold upon the soil.

The cultivator-tooth D is of a peculiar construction, and may be made either from wrought or cast metal. The tooth is hollow throughout and bell-shaped. The shank *a* of the tooth is round and about two inches in diameter, the whole length of the tooth being from six to eight inches. From the middle to the lower end the tooth expands rapidly in all directions, forming a bell-muzzle, as shown in Figs. 4 and 5.

The tooth D may be secured to the arm A or frame-work of the cultivator by means of screw-bolts passing through the upper end, as at *d*, or a bolt may be cast in. I prefer the former. The walls of the tooth are made quite thin, as much so as is consistent with strength. About one-fourth of an inch thickness of metal will give sufficient strength to the lower half. The shank may be a little thicker. The width of the expanded portion of the tooth *e e* should be equal to the length. Four, six, or more of these teeth may be used in one cultivator, and placed and secured to the frame in a circle having a radial distance of about eighteen inches from the center of the frame. The diameter of the circle upon which the teeth are placed and the number of teeth used will depend upon purposes to which the cultivator is to be applied. In the cultivation of maize and other plants usually planted in rows the width should be such as to pass freely between the rows. In this case the axle-tree should be lengthened so as to bring the wheel or wheels outside of the rows, as seen in Fig. 2 at R R.

Either one or two wheels may be used in this manner with the cultivator between the rows. In cultivating fallow ground the wheels may be placed close to the frame of the cultivator, as seen in Fig. 1. This cultivator in its operation sweeps over every inch of ground, cutting off every plant that stands in its track.

What I claim as my improvement, and desire to secure by Letters Patent, is—

1. The adjustable axle-tree I, bearing-wheels K and K', in combination with the cultivator-frame A B, axis C, and pipe-box E, when these parts are arranged and operated as and for the purpose specified.

2. The bell-shaped round-shanked tooth, constructed and operating as and for the purpose herein set forth.

A. W. OLDS.

Witnesses:
J. BRAINERD,
H. H. HODGES.